United States Patent
Winiger et al.

(10) Patent No.: US 7,058,656 B2
(45) Date of Patent: Jun. 6, 2006

(54) SYSTEM AND METHOD OF USING EXTENSIONS IN A DATA STRUCTURE WITHOUT INTERFERING WITH APPLICATIONS UNAWARE OF THE EXTENSIONS

(75) Inventors: Gary W. Winiger, Mountain View, CA (US); Bradford R. Wetmore, Sacramento, CA (US); John E. Zolnowsky, Milpitas, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 461 days.

(21) Appl. No.: 10/121,187

(22) Filed: Apr. 11, 2002

(65) Prior Publication Data

US 2003/0208492 A1   Nov. 6, 2003

(51) Int. Cl.
*G06F 17/00* (2006.01)
*G06F 7/00* (2006.01)

(52) U.S. Cl. .............. 707/103 R; 707/101; 707/104.1; 719/321

(58) Field of Classification Search ............ 707/1–206; 719/321
See application file for complete search history.

(56) References Cited

U.S. PATENT DOCUMENTS 5,390,301 A * 2/1995 Scherf ........................ 719/321
5,394,547 A * 2/1995 Correnti et al. ............. 717/175
5,734,894 A * 3/1998 Adamson et al. ........... 707/200
5,901,319 A * 5/1999 Hirst .......................... 717/164
6,170,018 B1 * 1/2001 Voll et al. ................... 719/330
6,336,120 B1 * 1/2002 Noddings et al. ........... 707/200

OTHER PUBLICATIONS

Hudson, S.E. and R. King "Cactis: A Self-Adaptive, Concurrent Implementation of an Object-Oriented Database Management System", ACM Transactions on Database Systems, vol. 14, No. 3, Sep. 1989, pp. 291-321.*
Stroustrup, B. "The C++ Programming Language, Second Edition", Reading:Addison-Wesley, 1991, pp. 97-99, 239-240, 313 and 465-468. ISBN 0-201-53992-6. QA76.73. C15S79 1991.*

* cited by examiner

*Primary Examiner*—Luke S Wassum
(74) *Attorney, Agent, or Firm*—Martine Penilla & Gencarella, LLP

(57) ABSTRACT

A data structure extension system for dynamically adding extensions to existing data structures without interfering with underlying code. The data structure extension system includes logic that allows a programmer to "privately" extend fields of existing entries in data structures in the operating system's kernel without interfering with the functionality of the overall data structure for other applications. An extension pointer disposed in the data structure associates each entry of the data structures extended with a respective extension table. The extension table allows for the dynamic addition of non-intefering interfering fields to the data structures. Each extension table entry has corresponding data stored in an external storage unit.

40 Claims, 9 Drawing Sheets

SYSTEM AND METHOD OF USING EXTENSIONS IN A DATA STRUCTURE WITHOUT INTERFERING WITH APPLICATIONS UNAWARE OF THE EXTENSIONS

FIELD OF THE INVENTION

The present claimed invention relates generally to the field of computer operating systems. More particularly, embodiments of the present claimed invention relate to a system for extending data structures in an operating system's kernel without having to change the underlying kernel code.

BACKGROUND ART

A computer system can be generally divided into four components: the hardware, the operating system, the application programs and the users. The hardware (central processing unit (CPU), memory and input/output (I/O) devices) provides the basic computing resources. The application programs (database systems, games business programs (database systems, etc.) define the ways in which these resources are used to solve the computing problems of the users. The operating system controls and coordinates the use of the hardware among the various application programs for the various users. In doing so, one goal of the operating system is to make the computer system convenient to use. A secondary goal is to use the hardware in an efficient manner.

The Unix operating system is one example of an operating system that is currently used by many enterprise computer systems. Unix was designed to be a simple time-sharing system, with a hierarchical file system, which supported multiple processes. A process is the execution of a program and consists of a pattern of bytes that the CPU interprets as machine instructions (text), data and stack. A stack defines a set of hardware registers or a reserved amount of main memory that is used for arithmetic calculations.

Unix consists of two separable parts: the "kernel" and the "system programs." Systems programs consist of system libraries, compilers, interpreters, shells and other such programs which provide useful functions to the user. The kernel is the central controlling program that provides basic system facilities. The Unix kernel creates and manages processes, provides functions to access file-systems, and supplies communications facilities.

The Unix kernel is the only part of Unix that a user cannot replace. The kernel also provides the file system, CPU scheduling, memory management and other operating-system functions by responding to "system-calls." Conceptually, the kernel is situated between the hardware and the users. System calls are the means for the programmer to communicate with the kernel.

System calls are made by a "trap" to a specific location in the computer hardware (sometimes called an "interrupt" location or vector). Specific parameters are passed to the kernel on the stack and the kernel returns with a code in specific registers indicating whether the action required by the system call was completed successfully or not.

The kernel comprises data structures which enable application programs to utilize the kernel. FIG. 1 is an illustration of a prior art kernel data structure 100. As shown in FIG. 1, the kernel data structure 100 comprises entries 101–106. Each of entries 101–106 comprises an offset of the address location for that entry in memory, the data 110 stored in the entry and the corresponding length of the data. The data portion 110 may be broken into many individual "fields" F1–F4 that all relate to the entry. Typically the information contained in a data structure is "static" that is, the size of the data portions 110 for each entry is fixed. Typically, the number of fields is fixed. A number of applications, such as the Solaris Basic Security Module (BSM) and Trusted Solaris relating to a Unix derivative operating system, such as the SUNOS™, have a need to keep project-specific data associated with the kernel data structure. These projects are optional additions to the base operation of the SUNOS™.

When taken together, these projects would needlessly increase the "static" size of the associated kernel data structures. The static nature of the data structure 110 makes it difficult for programmers to add extensions to the structure 110 once the structure is created because the data size is fixed. Any attempt to modify any one of the entries 101–106 would result in the size of the data structure 100 being modified. The change in size would prevent any application programs created prior to the modification of any one of the entries 101–106 to not work with that particular data structure in the underlying kernel.

A change to any of the data structure 101–106 would also lead to a displacement for other programs that use the structure. This will require the underlying kernel to be recompiled. This can be costly and time consuming.

SUMMARY OF INVENTION

Accordingly, to take advantage of the myriad of legacy application programs available and the increasing number of new applications being developed, a system is needed that has capabilities to allow a programmer to add extensions to kernel data structures without disrupting the functionality of the data structure for other operations. Further, a need exists for solutions to allow programmers to use existing legacy programs with modified data structures without having to recompile the underlying kernel in the operating system to take advantage of the new data structures. A need further exists for an improved and less costly program independent operating system, which improves efficiency and provide a means to compile programs without losing the embedded features designed in these programs. A need further exist to provide programmers the ability to privately extend existing data structures, transparently to other programs that use the extended data structure.

What is described herein is a computer system having a kernel structure that provides a technique for providing data extensions to existing data structures without having to recompile the kernel modules that use the data structure. Embodiments of the present invention allow programmers to add extensions to existing kernel data structures and a mechanism to add extensions to process and credential structures in a kernel. Embodiments of the present invention allows a programmer to add programmer specific extensions to kernel data structures without having to recompile the underlying operating system after the data structure is extended. In one embodiment of the present invention, the computer system includes a kernel structure extension system that includes an extension logic for enabling a programmer to write code to enable kernel modules to dynamically make "private extensions" to existing data structures for which an implementation has been delivered. The extension system implements a particular extension and its use (such as audit information associated with the process structure or privileges associated with the credential structure). For example, a kernel module may wish to register (make) an extension at the time it is loaded, or based upon an activation of some feature it supports. Kernel modules unaware of the private extensions can still make use of the data structure as long as they recognize the extension mechanism.

The extension logic further provides the programmer with a number of semantics that may be applied to the extension data along with the manipulation interfaces that interact with the data. The extension system of the present invention further allows the non-interfering additions to a single entity without the need for old code to change.

Embodiments of the present invention further include a logic to provide a generic storage extension mechanism for data structures previously "prepared" to accept such extensions. In one embodiment of the present invention, the extension logic allows extension pointers to dynamically grow existing data structures based on pointers unique to each data structure that allows private storage to be associated with top level data structures.

Embodiments of the present invention also include data structure logic that provides a mechanism for the extension logic to register extensions programmed by the programmer. Extensions may be entity-specific. The structure logic further provides a support infrastructure and interfaces for specific structure extension such as the process structure. The structure logic also allocates storage of the size registered for each extension.

Embodiments of the present invention further include framework logic that provides generic functions for the structure logic. The framework logic enables the structure logic to register new extensions provided by the programmer, access to an extension for a given structure, etc. In the present invention, the framework logic also provides a mechanism for implementing extension-specific call back vectors which define extension routines for initializing, copying and freeing of extension data to the base structure.

Embodiments of the present invention further include an extension data table for storing extension pointers that define the extension data stored in memory. The extension pointers are defined by the programmer to the extended kernel data structure. A respective extension table may be generated for each entry in the data structure. The extension data table is dynamically updated each time the programmer adds extensions to the kernel data structure. In the present invention, the extension data table includes an overhead entry that keeps track of the number of pointers defined by the programmer.

Embodiments of the present invention further include an extension pointer is defined as part of the data structure. The pointer points to an extension table for the entry. The extension table allows for the dynamic addition of non-interfering fields to that entry of an existing data structure. The new fields are non-interfering to programs that were written before the existence of the new field as long as these programs recognize the extension mechanism in general.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments.

On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

The embodiments of the invention are directed to a system, an architecture, subsystem and method to process data structure extensions in a computer system that may be applicable to operating system kernels. In accordance with an aspect of the invention, a data structure extension system provides a user the ability to privately extend kernel data structures for particular applications transparently to the underlying operating system and the other applications running in the computer system.

Figure 1:
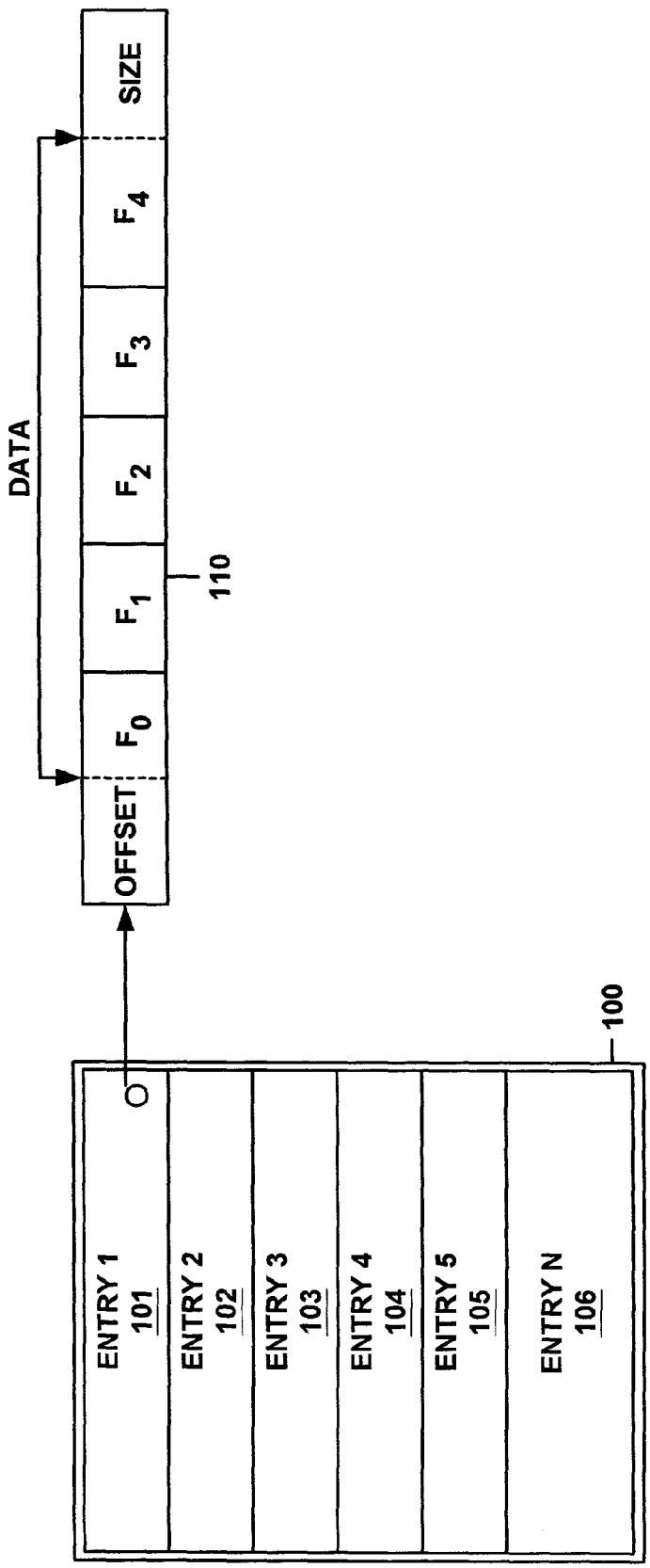
FIG. 1 is a block diagram of a prior art computer system.
Figure 2A:
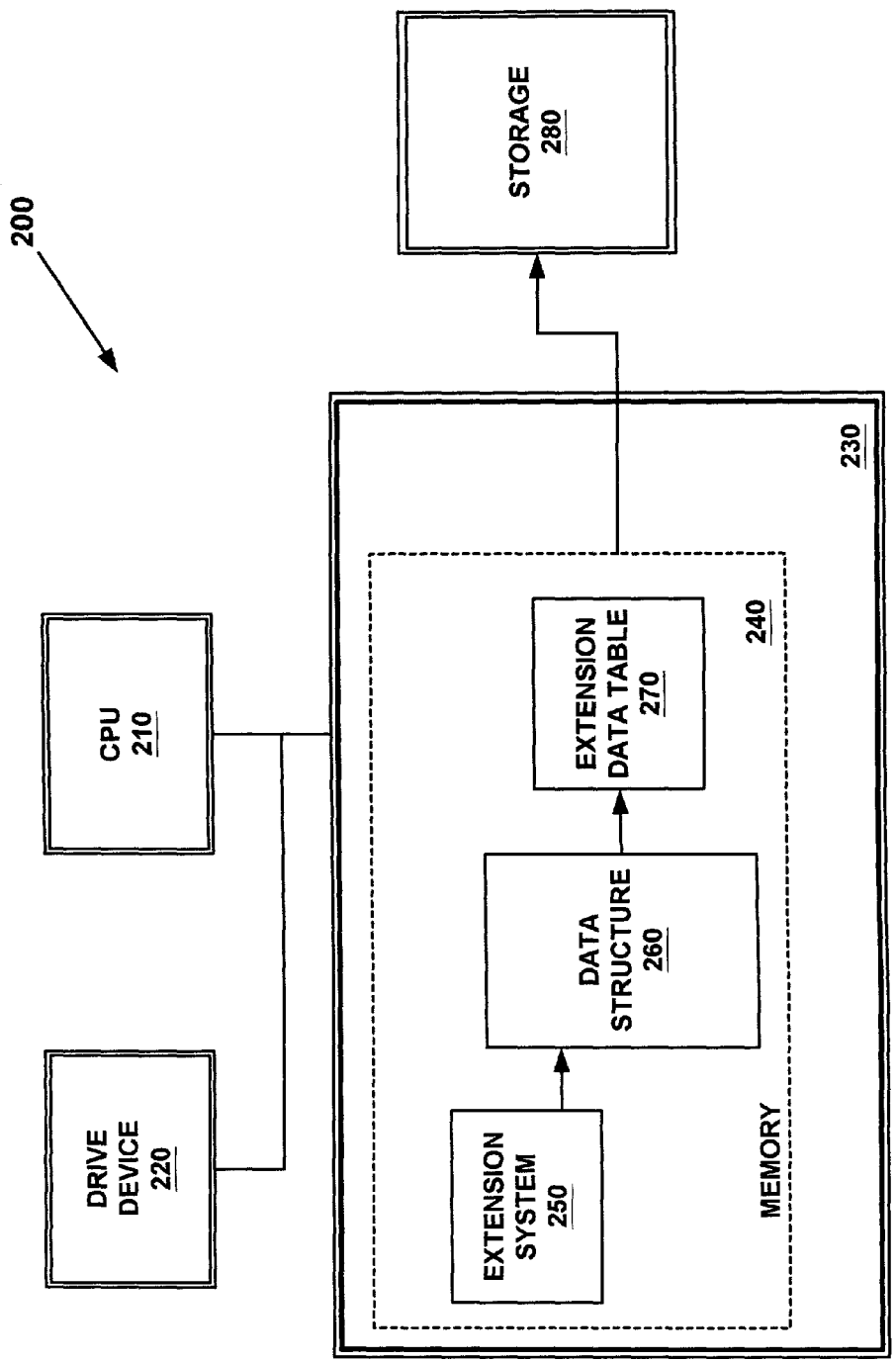
FIG. 2A is a block diagram of a computer system in accordance with an embodiment of the present invention.

FIG. 2A is a block diagram illustration of one embodiment of a computer system 200 of the present invention. The computer system 200 according to the present invention is connected to an external storage device 280 and to an external drive device 220 through which computer programs according to the present invention can be loaded into computer system 200. External storage device 280 and external drive 220 are connected to the computer system 200 through respective bus lines. Computer system 200 further includes main memory 230 and processor 210. Drive 220 can be a computer program product reader such a floppy disk drive, an optical scanner, a CD-ROM device, etc.

FIG. 2A additionally shows memory 230 including a kernel level memory 240. Memory 230 can be virtual memory which is mapped onto physical memory including RAM or a hard drive, for example, without limitation. During process execution, a programmer programs data structures in the memory at the kernel level memory 240. According to the present invention, the kernel memory level includes a plurality of data structures 260, extension system 250 and extension table space 270. The extension system 250 enables a programmer to add non-interfering data fields to existing data structures 260. Kernel data structure 260 contains extension pointers to private extensions that are created by the programmer to map the extensions data stored in the kernel memory 240.

Figure 2B:
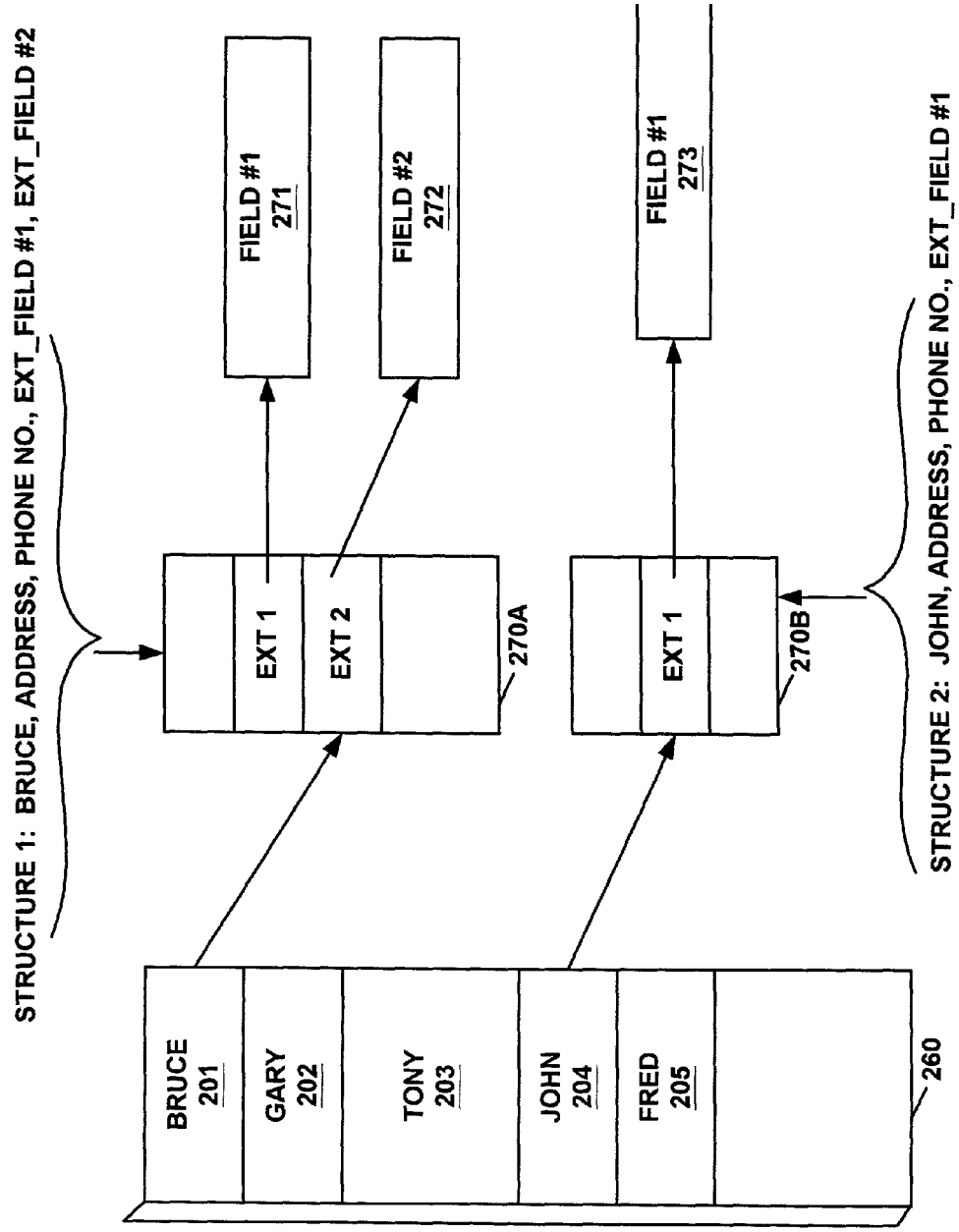
FIG. 2B is an exemplary embodiment of an extensible data structure of one embodiment of the present invention.

FIG. 2B is an exemplary block diagram illustration of one embodiment of the extensible data structures of the present invention. The exemplary data structure 260 comprises structure instances 201–205 each of which comprises information unique to the particular structure instance. In the example illustrated in FIG. 2B, the data structure instances 201–205 represent entries in a telephone directory data structure. Each of the entries 201–205 can have a corresponding extension table if an extension is to be made to that particular entry without interfering with the underlying functionality of the data structure 260. In the present invention, each of entries 201–205 can be extended to include information private to the extended data structure. For example, extensions are made in the extension tables 270A and 270B respectively for entries Bruce 201 and John 204. In the case of the first data structure instance 201, two non-interfering fields 271–272 are created to extend the telephone information for that entry.

For the second entry 204, the extension table 270B contains only one extension to indicate the addition of only one field 273. Each of these extensions are made without interfering with programs that are unaware of the extension fields. In one embodiment, the values stored in "ext 1" of the table 270A is the memory pointer to memory space 271. The same applies for memory space 272 and 273.

Figure 2C:
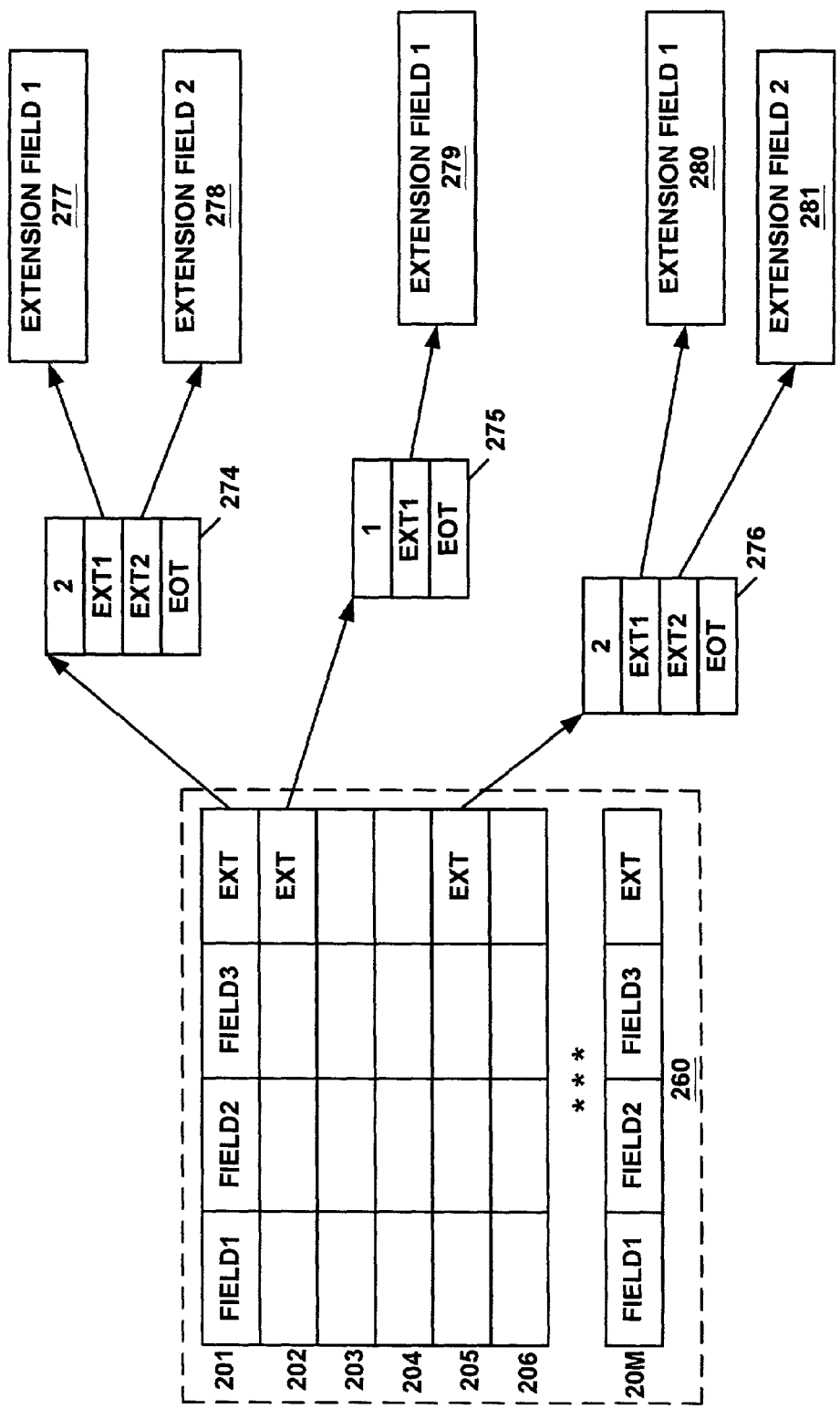
FIG. 2C is an exemplary embodiment of an extensible data structure entries with associating fields of one embodiment of the present invention.

FIG. 2C is an exemplary block diagram of a further illustration of one embodiment of the extensible data structure of the present invention. The exemplary data structure 260 comprises entries 201–20n. Each of the entries 201–20n comprises data fields and an extension pointer "EXT". Each extension pointer in any of entries 201–20n points to a corresponding extension table 274–276. The extension tables 274–276 store the values of the memory pointer to memory space 277–281 of the extension information applied to each one of entries 201–20n that is extended. In the exemplary illustration shown in FIG. 2c, entry 201 has three fields and an extension pointer that points to extension table 274. Extension table 274 has two extension entries that point to extension fields 277–278 in memory. In one embodiment of the present invention, the extension table 274, stores an overhead value of "2" to indicate the number of extensions made to entry 201.

Figure 3:
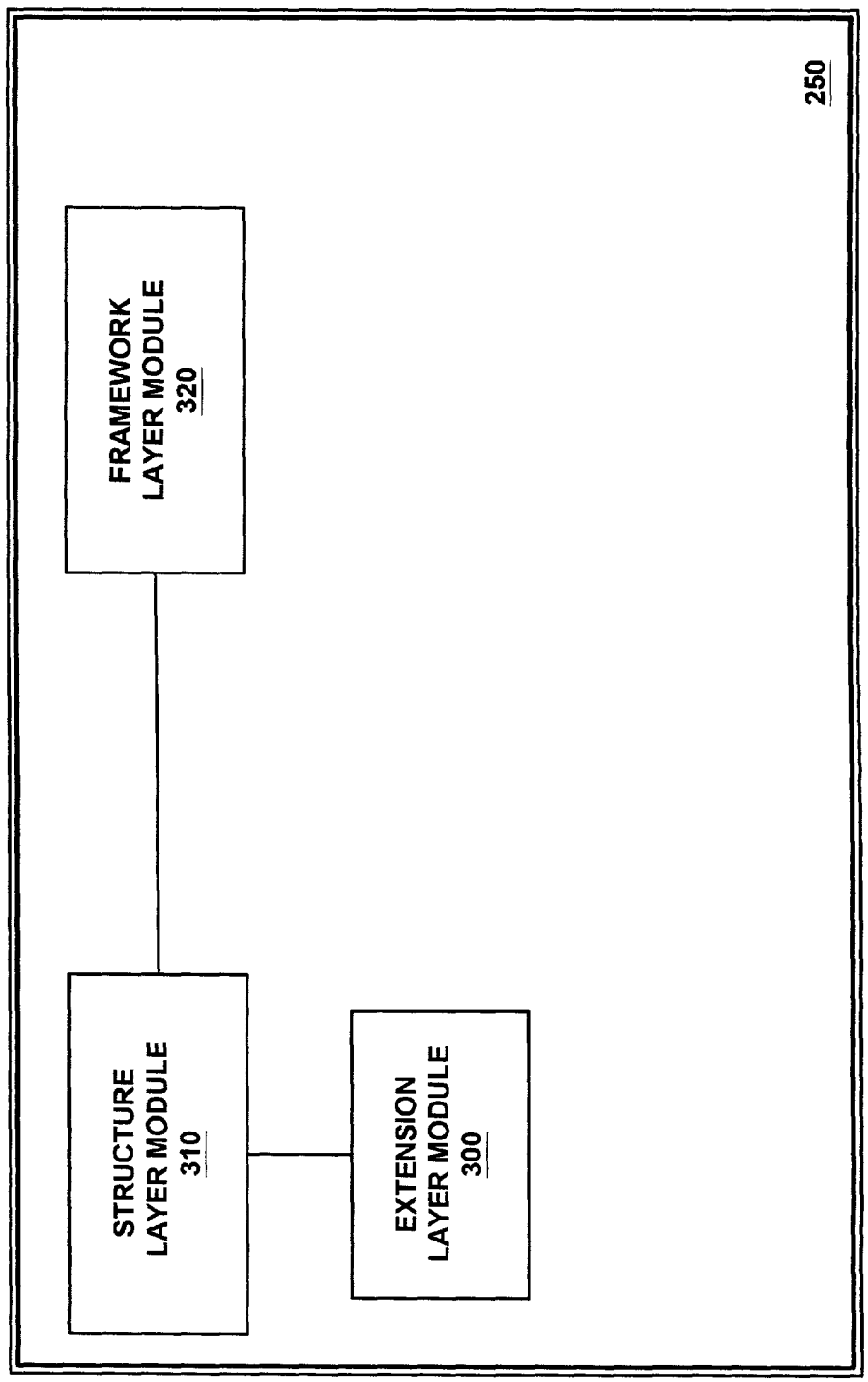
FIG. 3 is a block diagram of an embodiment of the kernel data structure extension system of the present invention.

FIG. 3 is a block diagram illustration of one embodiment of the kernel data structure extension system 250 of the present invention. The kernel data structure system 250 comprises extension layer module 300, structure layer module 310 and framework layer module 320.

The extension layer module 300 implements a particular extension and its use such as audit information associated with the process structure or privileges associated with the credential structure in the kernel. The extension layer module 300 registers extensions with the structure layer module 310.

The structure layer module 310 provides the support infrastructure and interfaces for a specific extension provided by the programmer to extend an existing data structure. In one embodiment of the present invention, the specific structure extension may be the process structure of the kernel data structure. The structure layer module 310 includes specific interfaces for initializing, freeing and updating of all extensions for a given structure.

The framework layer module 320 provides the functional logic blocks for the structure layer module 310. The function provided by the framework layer module 320 includes registering new extensions provided by the programmer for a particular data structure, accessing an extension for a given structure, etc.

In one embodiment of the present invention, the framework layer module 320 also provides a mechanism for allocating, copying and freeing extensions for a given structure. In another embodiment, the framework layer module 320 provides mechanisms for extension-specific call back vectors. These vectors define extension routines for initializing, copying and freeing of extension data and can also be extended to handle additional extension-defined functions.

Figure 4:
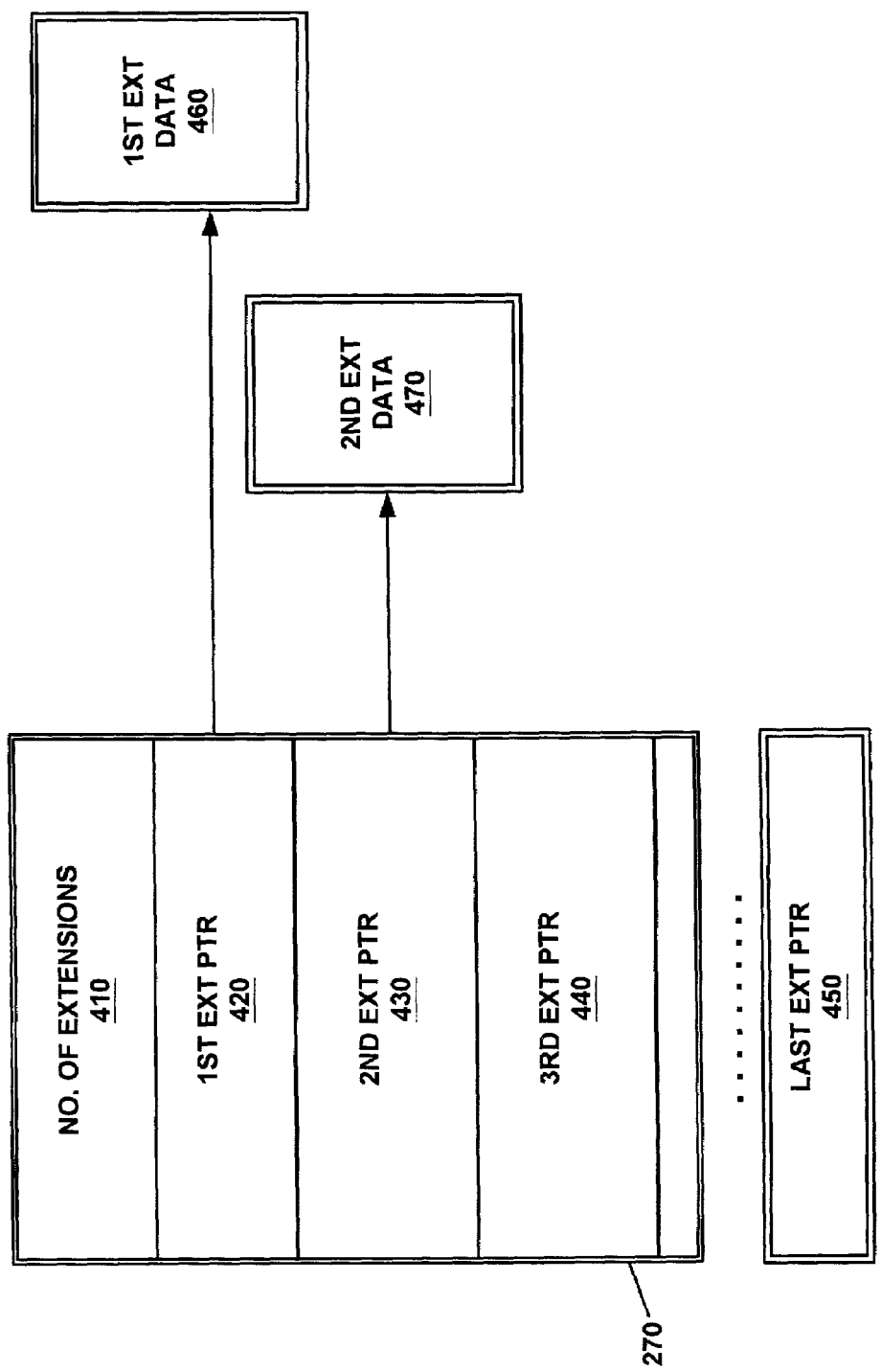
FIG. 4 is a block diagram of one embodiment of the extension data table of an embodiment of the present invention.

Reference is now made to FIG. 4 which is a block diagram illustration of one embodiment of the extension data table system 270 of the present invention. As depicted in FIG. 4, the extension data table 270 comprises overhead entry 410, extension pointer entries 420–450, associated extension data 460–470. The extension data table 270 is dynamically updated with extension pointers (e.g., 420–450) as the programmer adds extensions to the kernel data structure. An extension data table 270 is maintained for each entry of a data structure that has extensions defined for it.

The overhead entry 410 stores the total number of pointer entries in the extension data table 270 at any time. As new extensions are created and new pointers are added to table 270, the contents of the overhead entry 410 is dynamically updated to reflect the changes in the pointer count.

The extension pointer entries 420–450 store the extension pointers created by the programmer for particular data added for the entry. Each extension pointer (e.g., memory address) is associated with a corresponding extension data 460–470 in the memory storage 230. In one embodiment of the present invention, extension work relative to pointers contained in the base data structure. There is no "static" size increase to the base structure beyond the additional pointers required to make the structure extensible.

The size of the extension data table 270 is increased by one entry each time an extension is registered for a given entry. In one embodiment of the present invention, a respective extension data table 270 may be defined for each entry of the data structure created after the extension system 250 has been compiled.

Figure 5:
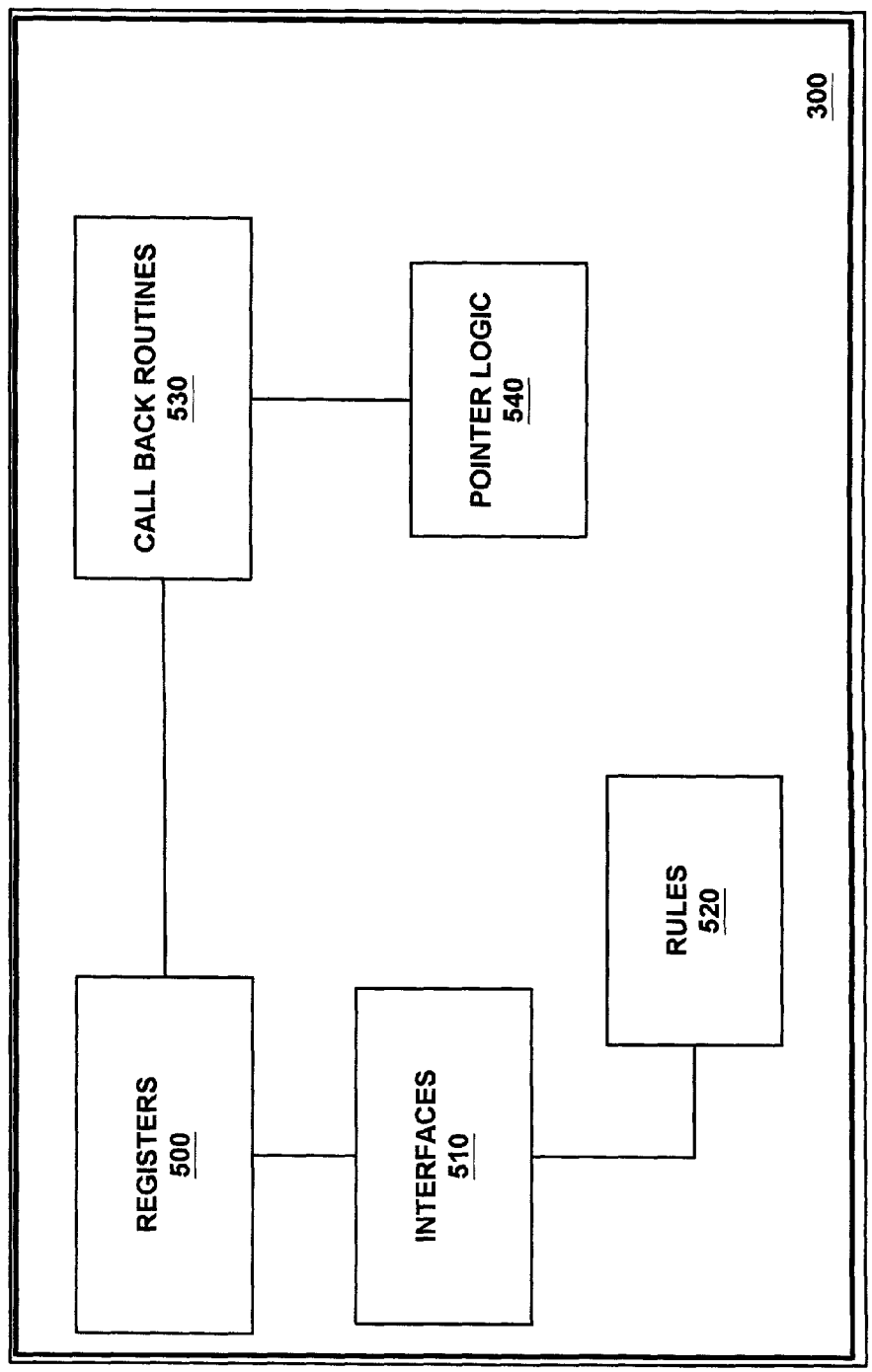
FIG. 5 is a block diagram of one embodiment of a data structure extension logic of the present invention.

FIG. 5 is a block diagram illustration of one embodiment of the extension layer module 300 of the present invention. As shown in FIG. 5, the extension layer module 300 comprises registers 500, interfaces 510, program rules 520, routines 530 and pointer logic 540.

The extension layer module 300 is the code that the programmer writes to perform the data extension in the present invention. The extension layer module 300 consists of whatever semantics that are applied to the extension data along with the manipulation of interface 510. For example, an extension to add privileges to credential structures are implemented at this layer and it makes use of the credentials extension structure layer.

The registers 500 provide a mechanism for the extensions created by the programmer to register their existence with the particular data structure for which the extension was created. An extension created would register its existence to the intended structure providing a name for the extension, the size (number of bytes of storage) to allocate when the extension is added to a new instance of a data structure, a vector call back 530 function that will initialize the extension contents when a new data structure is created.

When a module registers an extension to the structure layer 320, it receives a key to use for all references to the registered extension. In one embodiment of the present invention, along with registering a size for a given extension, a "cookie" is used for book-keeping purposes.

The call back routines 530 provide an optional call back operations vector when an extension is registered. If a extension provides a call back vector, it contains optional routines for initialization, copying and freeing entries relative to the extension. For example, extensions for credentials may have an additional routine for credentials comparison. Other structure layer extensions may provide other additional call-back routines.

Building the Extension Layer

The extension layer 300 is where the actual implementation of the kernel data structure is done. The framework layer 320 and structure layer 310 are provided to simplify the extension layer implementation. Any structure for which a structure layer 310 has been defined may have an arbitrary number of independent extensions. The extension layer 300 defines the name of the extension, any default values, the semantics of extension initialization, copy and free through providing extension specific call-back functions. If there are additional call-backs defined for the structure (such as a compare call-back for the credential structure), those call-backs are provided as needed. The code for manipulating the extended data associated with an instance of the structure is also defined. An exemplary process structure extension is shown in Table I below:

TABLE I

```
Typedef struct procx_ops{
    void (*procx_init)(proc_t *pr, ext_flags_t flags);
    void (*procx_copy)(proc_t *opr, proc_t*npr, ext_flags_t flags);
    void (*procx_free)(proc_t *pr, ext_flags_t flags);
} procx_ops_t;
extern int procx_register(char *cookie, size_t size,
procx_ops_t*ops,ext_flags_tflags, ext_key_t *key, int vers);
extern void *proc_get(proc_t *old, ext_key_t key);
extern void *proc_preallocate(ext_key_t key);
extern void procx_discard(ext_key_t key, void *handle);
extern void *proc_attach(proc_t *old, ext_key_t key, void
*handle).
```

The programming rules 520 for using process extension call backs and interfaces are defined as:

1. All process extensions need to either pass NULL for the call-back vector if on call-backs are required, or provide a call-back vector. If an individual call-back is not required, the function pointer should be NULL. NULL fucntions avoid overhead in the framework of calling them.

2. void procx_init(proc_t *pr, ext_flags_t flags)

Whenever process extension storage is allocated for a new process structure, it is preset to zero. If all zeros is an appropriate default value for the process extension, no procx_init( ) routine is necessary.

The "procx_init( )" routine is called whenever an old process is being duplicated to a new process and the old process does not have this process extension present. It takes a pointer to the new process structure as input. It is called in the context of "getproc( )" during "newproc( )" and "cfork( )" processing. "procx_init( )" is expected to initialize its process extension to an appropriate default value. It is called with the process' lock (p_lock) held and possibly with pidlock held as well, it must neither allocate memory, nor wait on resources which in turn may wait on the process lock of pidlock.

3. void procx_copy(proc-t *opr, proc_t *npr, ext_flags_t flags)

Whenever process extension storage is copied from one process structure to another, it is by default an exact copy of the first process structure. If this is an appropriate value for the process extension, no "procx_copy( )" routine is necessary.

The "procx_copy( )" routine is called whenever an old process (opr) is being duplicated to a new process and the old process has the process extension present. It takes pointers to the old and new process structures as inputs. It is called in the context of "getproc( )" during "newproc( )" and "cfork( )" processing. The "procx_copy( )" function call is expected to make whatever adjustments are necessary to the extension copy (such as testing if the value is the default and if not updating reference counts) in the new process. It is called with the process' lock (p_lock) held and possibly with pidlock held as well, it must neither allocate memory, nor wait on resources which in turn may wait on the process' lock or pidlock.

4. void procx_free(proc_t *pr, ext_flags_t flags)

Whenever a process (and its pid) is freed (during exit-freeproc( ), failed fork or failed "newproc( )" processing when "pid exit( )" calls "procfree( )") prior to returning the process structure to the pool of unused process structures, the extension's "procx_free( )" routine is called. If returning the extension storage associated with the process to the pool of available processes is the only necessary action, no "procx_free( )" routine is necessary.

The "procx_free( )" routine is called in the context of "proc_free( )". It takes a pointer to the process structure being freed as input. It is expected to do any necessary freeing actions for its extension (such as testing if the value is the default value and if not updating reference counts and freeing memory allocated by the extension's "modify" routine(s)). It is called with the process' lock(p_lock) held and with pidlock held as well, it must neither allocate memory (such action is not meaningful in a free routine), nor wait on resources which in turn may wait on the process' lock or pidlock.

5. int procx_register(char *cookie, size_t, procx_ops_t *ops, ext_flags_t flags, ext_key_t *key, int vers)

Whenever a new process extension is registered, its name (cookie), size, call-back vector (ops), flags passed to the call-back functions for their use), version number (vers), used to ensure interface consistency, are passed to procx register. A key (key) to use in the other process extension interfaces is returned. Procx_register return value zero (0) indicates success, otherwise an error is returned. Memory is allocated within the procx_register request, so the caller must not hold any locks.

6. void *procx_get(proc_t *old, ext_key_t key)

Whenever a process' extension data is to be referred to, the procx_get routine is called. Procx_get returns a pointer to the extension's data associated with the specified process (old). A NULL return value indicates that the process existed before this extension was registered and the values should be treated as if they were defaults (presumably the same values as set by the registered "procx_init( )" routine.

7. void *procx_preallocate(ext_key_t key)

Since the extensions are not known until they are registered, it is possible to have an old process without the current extension (such as p0). In this case "procx_get( )" will return NULL. When this occurs, it is necessary to "preallocate" the extension's data and attach it to the process extension ("procx_attach( )") before making updates. As memory is allocated by procx_preallocate( ), no locks may be held. The process' lock (p_lock) must be held during the "procx_attach( )" and subsequent data update to ensure other threads are not simultaneously attaching the extension.

8. void procx_discard(ext_key_t key, void, void *handle)

Whenever a process' extension data has been preallocated ("procx_preallocate( )"), but is not going to be used for some reason (i.e., an error was encountered) "procx_discard( )" must be called to free the preallocated storage.

9. void *procx_attach(proc_t *old, ext_key_t key, void *handle)

Whenever a process' extension data has been preallocated ("procx.preallocate( )") and is to be used as the data associated with the specified process (old) it is attached to the process by calling "procx_attach( )". "Procx_attach( )" attaches the "preallocated" storage, initializes it by calling the "procx_init( )" call-backs and returns a pointer to the process extension data (without the need to call "procx_get( )") which may now be updated. If another thread has already attached the process extension data, this pre-allocated data is automatically discarded ("procx_discard( )") and a pointer to the existing process extension data is returned. The process' lock (p_lock) must be held during the attach operation. This ensures that parallel registration of a new process extension does not invalidate the current extension pointer.

Figure 6:
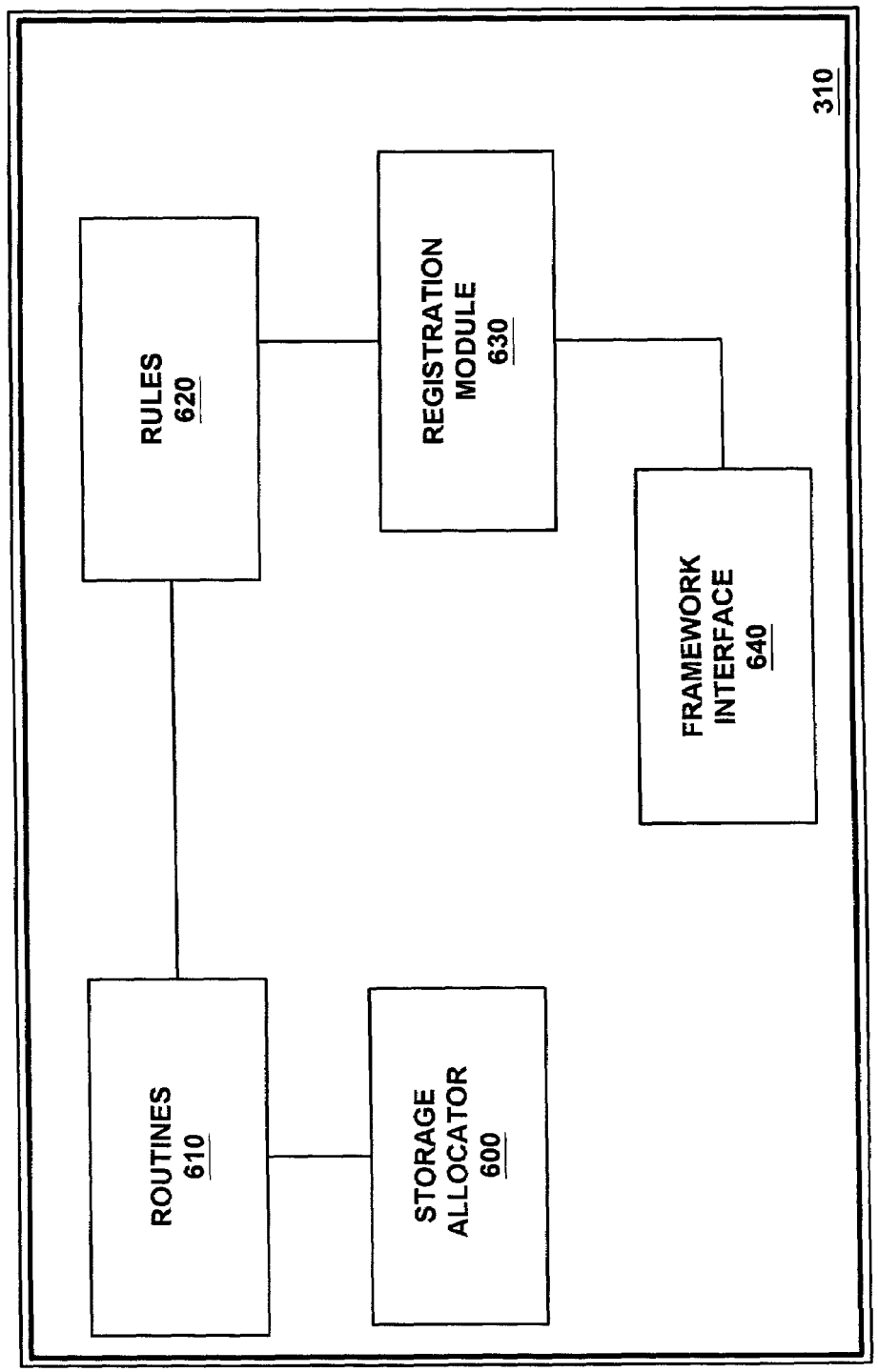
FIG. 6 is a block diagram of one embodiment a structure logic of an embodiment of the kernel data structure extension system of the present invention.

FIG. 6 is block diagram of one embodiment of the structure layer module 310 of the present invention. The structure layer module 310 comprises storage allocator 600, routines module 610, rules module 620, registration module 630 and framework interface module 640.

The structure layer module 310 provides the structure specific interfaces for initialization, freeing and updating all extensions for a given structure. The storage allocator 600 allocates storage for the size registered for each extension created by the programmer for a particular data structure. The registered "initialized" call-back routine is invoked after storage allocation to set default values for the extension is made.

The routines module 610 provides routines for the extension layer 300 and the framework layer 320 to register routines for extensions initiated by the programmer. In one embodiment of the present invention, a copy routine or a free routine may be registered to copy old extensions to new extensions or free up storage for an extension respectively.

The copy call-back routine is called whenever storage from an old extension is to be copied (or duplicated) to a new extension (for example, process fork, credential crcopy*, crdup*, . . . ). First an exact copy (bcopy) of the old extension to the new extension is done. The registered copy routine is expected to make whatever adjustments are necessary to the old and new extension, such as testing if the value is the default, and if not updating reference counts.

The registered free routine is called whenever a storage for an extension is to be freed (for example, process exit, credential crfree). The registered free routine is expected to do any freeing such as checking for default value, and if not decrementing reference count and freeing allocated storage.

Following the completion of the registered free routine any other storage such as the extension data table will be freed.

Still referring to FIG. 6, the rules modules 620 provides the rules for each of the structure layer 310 functions. For example, the rules modules 620 determines what locks need to be held before getting a handle to an extension access routine, or what locks are held when a call-back function is called.

The registration module 630 provides the structure layer 310 with registration capabilities to register routines and interfaces presented to the structure layer 310 by the extension layer 300 and the framework layer 320 respectively.

The framework interface module 640 provides most of the functions needed to build any structure layer. They automatically call the defined call-backs for each registered extension when a new copy is allocated, an old structure is copied to a new structure, a structure is freed. Interfaces to walk the registered call-back vector allows for structure extensions with additional call-backs to be easily implemented.

Building a Structure Layer

A structured layer 310 can be built for any architecture which has a extension pointer reserved in its definition. If there is no extension pointer already reserved, one should be added to the base structure. Next, all the places the structure memory is allocated is copied and freed need to be identified. Ideally the structure is centrally allocated, copied and freed. If it is not, perhaps it should be made so. For structures where memory allocation can't take place because of locks define a pre-allocate, attach, and discard routine that calls the framework equivalent.

This is generally required for read/write structure (and not for copy-on-write structures) because the structure update lock needs to be held to attach memory. For all structures types define a registration and access routine for the given structure which calls the framework equivalents. In the places where the structure is allocated, copied, freed, insert calls to the corresponding framework routines. If additional functions are native for the structure, such as comparison, additional call back routines may need to be defined. The copying and initializing routines 540 are called in an appropriate state where the call back routine 530 may update their extension data, but in general should not allocate memory unless permitted by the program rule defined for the structure.

Figure 7:
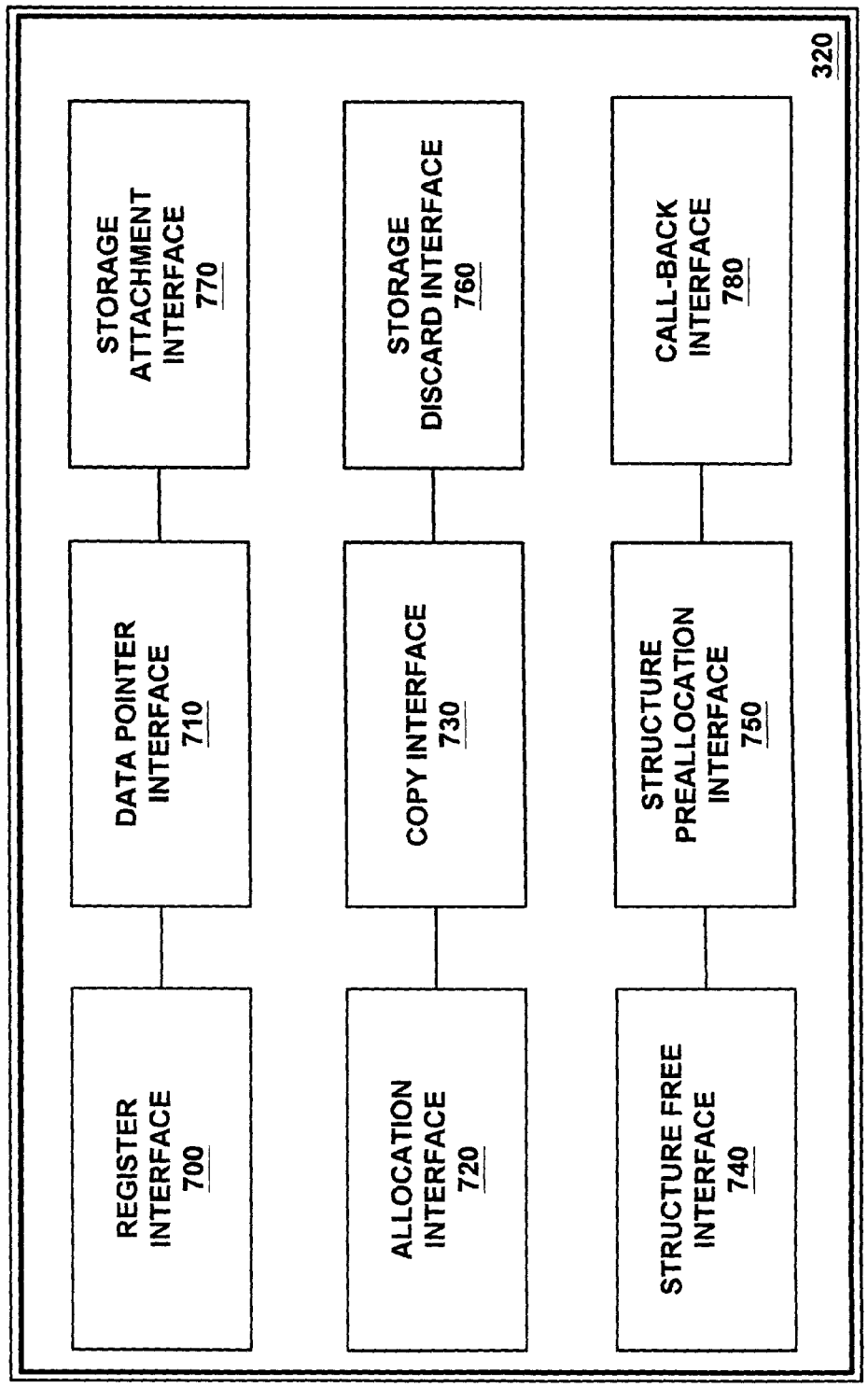
FIG. 7 is a block diagram of one embodiment of a framework logic of the kernel data structure system of one embodiment of the present invention.

FIG. 7 is a block diagram illustration of one embodiment of the framework layer module 320. The framework layer module 320 comprises structure specific interface 700, data pointer interface 710, allocation interface 720, copy function interface 730, structure free interface 740, structure specific pre-allocation interface 750, storage discard interface 760, storage attachment interface 770 and call-backs interface 780.

The structure specific interface 700 is used to build the structure specific registration interface. It registers (defines) a new extension for a given structure type (objp). The structure specific interface 700 also accepts the extension name (e.g., cookie) which must be unique among the extensions to the given structure type. The call-back vector (ops, extension size, and flags to be passed to each call back are registered under the name. A key is returned to be used to access this extension from the base structure ext_register allocates memory and sleeps if it not available. The interface 700 must not be called with lock held.

The data pointer interface 710 provides the extension system 250 the ability to build the structure specific extension get data pointer function. It takes the address of the offset into the structure (extdata_ptr), and the key of the registered extension and returns a pointer to the extensions data. No locking is required. A NULL value is returned if the extension does not exist on the given structure instance.

The allocation interface 720 is used by the extension system 250 to build the structure specific allocation function. It is called after a new structure is allocated from a pool of unused structures to allocate and attach the structure extension data for all registered extensions. New is a pointer to the newly allocated structure, a flag which is set to either KM_SLEEP or KM_NOSLEEP to indicate the structure layer 310 can tolerate memory allocation retries. Callers using the KM_SLEEP flag do not hold any locks. After zero (0) filling the allocated data, it calls the structure data initialization (extopt_init) call backs for each extension registered on the structure type (objp) with the registered flags.

The copy function interface 730 is used by the extension system 250 to build the structure specific copy function. It is to called after an existing structure is copied to a new one. After making an exact copy (bcopy), it calls the structure data copy (extopt_copy) call-backs for each extension registered on the structure type (objp) with the registered flags. The structure layer 310 caller must hold whatever locks are necessary to safely update the new structure instance.

The structure free interface 740 is used to build the structure specific free function. It is called before doing a final free of the structure back to its pool of unused structures. It first calls the structure free (extopt_free) call-back with the registered flags, then frees the registered data size for each extension registered on the structure type (objp). Finally it frees the extension data table associated with the structure instance. The structure layer 310 caller should hold whatever locks are necessary to safely free the structure instance.

Still referring to FIG. 7, the structure preallocation interface 750 is used to build the structure specific "preallocation" function. Preallocation is necessary when the nature of the structure is such that locks must be held to update it (usually true of read/write structures, but not copy-on-write structures). It reserves the data storage size registered to the key for the structure type (objp) and returns an opaque handle for that storage's subsequent reference. It sleeps until the requested memory becomes available. It should not be called with locks held. A ext_preallocate function returns a handle to be used in a subsequent "ext_attach( )" or "ext_discard( )" call.

The storage discard interface 760 is used by the extension system 250 to build the structure specific "pre-allocated" storage discard function. It discards the storage allocated by "ext_preallocate( )" and referred to by the handle. Storage needs to be discarded if it is not subsequently passed to "ext_attach( )". For example, if an error was detected between calling the "ext_preallocated( )" and "ext_attach( )" structure layer 310 interfaces by the extension layer 300 code, the extension layer 300 code will call the structure layer 310 interface that issues "ext_discard( )".

The storage attachment interface 770 is used to build the structure layer 310 specific "preallocated" storage attachment function. It attaches the storage allocated by "ext_preallocated( )" to the key extension of the old structure instance of type (objp) and initializes the storage by calling the registered "ext_init( )" call-backs. If it determines that the key extension on the old instance already has storage attached, it discards the preallocated storage. In all cases, it returns a pointer to the structure specific data. This avoids a separate call to "ext_get( )" in order to make use of the data storage. The caller should hold whatever locks are necessary to safely update the structure instance old.

The call-backs interface 780 is used to build a structure layer 310 function that calls any structure layer 310 specific call-backs not handled at the framework layer 320. For example, the credential structure layer defines a credential comparison call-back which makes use of a "ext_getnext_ops" call to find call-back vector for all registered credential extensions and call the comparison call-back in the context of doing a comparison of two credentials. Other structure layer object types may have need to have more call-backs than the initialize, copy and free call-backs called by the framework layer 320. A "ext_getnext_ops" call works through the context of a state variable (initialized to NULL) and returns a call back vector pointer and associated flags for each registered extension. NULL is returned when all the registered extensions have been enumerated.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the claims appended hereto and their equivalents.

The invention claimed is:

1. A computer system, comprising:
    a processor;
    a memory storage unit;
    an operating system comprising a kernel, said kernel comprising a plurality of static data structures each comprising entries, each entry comprising one or more fields where one field is for storing an extension pointer for pointing to an extension table of the kernel;
    a data structure extension system, of the kernel, capable of being programmed to add non-interfering fields and having a framework layer module for implementing extensions to fields of a static data structure without interfering with kernel components that use said static data structure and were compiled prior to said extensions thereof; and
    the extension table of the kernel having pointers referencing an extended data field stored in said memory storage unit.

2. The computer system of claim 1, wherein said data structure extension system comprises an extension layer module for implementing said extensions to said static data structure.

3. The computer system of claim 2, wherein said data structure extension system further comprises a structure layer module for providing support infrastructure and interfaces for a specific extension made to said static data structure.

4. The computer system of claim 3, wherein said framework layer module provides a plurality of interfaces for all extensions implemented by said data structure extension system to said static data structure.

5. The computer system of claim 1, wherein each extension table of the kernel is defined for an associated entry.

6. The computer system of claim 1, wherein said extension table of the kernel comprises an overhead entry for storing a total number of pointers stored in said extension table of the kernel.

7. The computer system of claim 6, wherein said extension table of the kernel dynamically allows for the addition of said non-interfering fields for existing static data structures in said kernel.

8. The computer system of claim 7, wherein said extension layer module comprises a plurality of registers for registering the details of said non-interfering fields when said non-interfering fields are registered.

9. The computer system of claim 8, wherein said details of said non-interfering fields include a name for said extension.

10. The computer system of claim 9, wherein said details of said non-interfering fields further include size information defining the data byte size to allocate in said memory storage unit when said extension is created.

11. A computer operating system, comprising:
a kernel comprising a plurality of static data structures, each comprising entries, each entry comprising one or more fields where one field is for storing an extension pointer for pointing to an extension table of the kernel;
a data structure extension unit, of the kernel, capable of being programmed and dynamically defining new fields for said plurality of static data structures without interfering with the processing of said plurality of static data structures by kernel modules compiled in said kernel prior to said new fields being defined; and
the extension table of the kernel coupled to said data structure extension unit for storing pointers referencing an extended data field stored in a storage unit of the operating system.

12. The computer operating system of claim 11, wherein each extension table of the kernel is defined for an associated entry.

13. The computer operating system of claim 12, wherein said extension table of the kernel dynamically allows non interfering data fields to be added to existing static data structures in said kernel.

14. The computer operating system of claim 13, wherein said extension table of the kernel further comprises an overhead entry for storing a total number of pointers stored in said extension table of the kernel.

15. The computer operating system of claim 12, wherein said new fields are non-interfering for data structures existing prior to the creating of said new fields.

16. The computer operating system of claim 15, wherein said data structure extension unit comprises an extension layer module for adding extension data and implementing said new fields to said plurality of static data structures.

17. The computer operating system of claim 16, wherein said extension layer module comprises a plurality of registers for registering details of said non-interfering data field when said non-interfering data field is created.

18. The computer operating system of claim 17, wherein said extension layer module further comprises pointer logic for associating said non-interfering data field with a corresponding extension data stored in said external data storage.

19. The computer operating system of claim 16, wherein said data structure extension unit further comprises a structure layer module for providing support infrastructure and interfaces for a specific extension data added to said plurality of static data structures.

20. The computer operating system of claim 19, wherein said data structure extension unit further comprises a framework layer module for providing a plurality of interfaces for said extension data added by said extension layer module.

21. The computer operating system of claim 20, wherein said framework layer module comprises register interface for building structure specific registration interface into said data structure extension unit.

22. The computer operating system of claim 21, wherein said framework layer module further comprises data pointer interface for providing said data structure extension unit the ability to build structure specific data retrieval functions.

23. The computer operating system of claim 22, wherein said framework layer module further comprises storage allocation interface for allocating storage in an external data storage for extension data associated with said new field.

24. The computer operating system of claim 23, wherein said framework layer module further comprises storage attachment interface for building structure specific pre-allocated storage function in said data structure extension unit for pre-allocating storage space for extension data for said plurality of static data structures.

25. The computer operating system of claim 24, wherein said framework layer module further comprises data copy interface for providing a data copy function for copying existing data in an existing static data structure into a newly created static data structure.

26. The computer operating system of claim 25, wherein said framework layer module further comprises call-back interface for providing call-back routine functions to said existing and newly created static data structures.

27. The computer operating system of claim 26, wherein said framework layer module further comprises data storage discard interface for discarding extension data associated with a deleted non-interfering field of an extended static data structure from said external data storage.

28. The computer operating system of claim 27, wherein said framework layer module further comprises data structure pre-allocation interface for reserving data storage sizes registered for a particular existing or newly created static data structure.

29. A computer implemented data storage system comprising:
a static data structure, of a kernel of a computer operating system, comprising a plurality of entries wherein each entry comprises one or more fields;
wherein one of said fields is for storing an extension pointer for pointing to an extension table of the kernel;
wherein said extension table of the kernel comprises pointers referencing an extended data field and wherein said extended data field is transparent to kernel modules that access said static data structure but are unaware of said extended data field; and
a data structure extension system, of said kernel, capable of being programmed to add non-interfering data fields to said static data structure.

30. A system as described in claim 29 wherein said extension table of the kernel further comprises an entry indicating the number of valid extension pointers maintained therein.

31. A system as described in claim 29 wherein application programs in the system are aware of said extension pointer field of said static data structure.

32. A computer system, comprising:
a processor;
a memory storage unit;
a computer software applications program, at a kernel level of a computer operating system, comprising a plurality of static data structures each comprising entries, each said entries comprising one or more fields, where one field is for storing an extension pointer for pointing to an extension table of the kernel;

a data structure extension system, at the kernel level, capable of being programmed to add non-interfering fields and having a framework layer module for dynamically implementing extensions to fields of a static data structure without interfering with components of said computer software applications program that use said static data structure and were compiled prior to said extensions thereof; and the extension table of the kernel having pointers referencing an extended data field stored in said memory storage unit.

33. The computer system of claim 32, wherein said data structure extension system comprises an extension layer module for implementing said extensions to said static data structure.

34. The computer system of claim 33, wherein said extension layer module comprises a plurality of registers for registering the details of said non-interfering fields when said non-interfering fields are registered.

35. The computer system of claim 34, wherein said details of said non-interfering fields include a name for said extension data.

36. The computer system of claim 35, wherein said details of said non-interfering fields further include size information defining the data byte size to allocate in said memory storage unit when said extension data is created.

37. The computer system of claim 32, wherein said framework layer module provides a plurality of interfaces for all extensions implemented by said data structure extension system to said static data structure.

38. The computer system of claim 32, wherein each extension table of the kernel is defined for an associated entry.

39. The computer system of claim 32, wherein said extension table of the kernel comprises an overhead entry for storing a total number of pointers stored in said extension table of the kernel.

40. The computer system of claim 39, wherein said extension table of the kernel dynamically allows for the addition of said non-interfering fields for existing static data structures in said kernel.

* * * * *